United States Patent
Schmidt et al.

(10) Patent No.: US 9,669,874 B2
(45) Date of Patent: Jun. 6, 2017

(54) VEHICLE

(71) Applicant: SEW-EURODRIVE GMBH & CO. KG, Bruchsal (DE)

(72) Inventors: Josef Schmidt, Graben-Neudorf (DE); Dirk Degen, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 14/760,111

(22) PCT Filed: Dec. 20, 2013

(86) PCT No.: PCT/EP2013/003886
§ 371 (c)(1),
(2) Date: Jul. 9, 2015

(87) PCT Pub. No.: WO2014/108162
PCT Pub. Date: Jul. 17, 2014

(65) Prior Publication Data
US 2015/0353137 A1 Dec. 10, 2015

(30) Foreign Application Priority Data
Jan. 10, 2013 (DE) .................. 10 2013 000 259

(51) Int. Cl.
| | |
|---|---|
| *B62D 21/14* | (2006.01) |
| *B60L 15/20* | (2006.01) |
| *B60L 15/00* | (2006.01) |
| *B66F 9/075* | (2006.01) |
| *B62D 53/02* | (2006.01) |

(52) U.S. Cl.
CPC ............ *B62D 21/14* (2013.01); *B60L 15/007* (2013.01); *B60L 15/20* (2013.01); *B62D 53/02* (2013.01); *B66F 9/075* (2013.01); *B66F 9/07522* (2013.01); *Y02T 10/7258* (2013.01)

(58) Field of Classification Search
CPC ....... B62D 21/14; B62D 53/02; B60L 15/007; B60L 15/20; B66F 9/075; B66F 9/07522
See application file for complete search history.

(56) References Cited

U.S. PATENT DOCUMENTS

| | | | |
|---|---|---|---|
| 6,199,894 B1 * | 3/2001 | Anderson | B62D 21/12 180/209 |
| 8,215,657 B1 | 7/2012 | Gist | |
| 2012/0145471 A1 | 6/2012 | Tan et al. | |

FOREIGN PATENT DOCUMENTS

GB  2 467 586  8/2010

OTHER PUBLICATIONS

International Search Report, dated Mar. 4, 2014, issued in corresponding International Application No. PCT/EP2013/003886.
(Continued)

*Primary Examiner* — Faye M Fleming
(74) *Attorney, Agent, or Firm* — Andrews Kurth Kenyon LLP

(57) ABSTRACT

A vehicle having two chassis components, which are connected by a sloping plane, especially by a guidance device and/or sliding bearing along a sloping plane, a first drive wheel being situated on at least one of the chassis components, and one wheel on the other chassis component, a rotational speed differential between the rotational speed of the drive wheel and the rotational speed of the wheel being able to be induced by a device.

14 Claims, 4 Drawing Sheets

(56) References Cited

OTHER PUBLICATIONS

International Preliminary Report on Patentability, dated Jul. 23, 2015, issued in corresponding International Application No. PCT/EP2013/003886.

* cited by examiner

VEHICLE

FIELD OF THE INVENTION

The present invention relates to a vehicle.

BACKGROUND INFORMATION

It is common knowledge that vehicles can be driven by means of a drive wheel. A forklift additionally has a lifting axle for raising or lowering a load. However, the lifting axle requires a drive unit.

SUMMARY

Therefore, the present invention is based on the objective of further refining a vehicle in a more compact and easily producible manner.

Features of the present invention in the vehicle are that the vehicle has two chassis components, which are connected by a sloping plane, especially by a guide and/or plain bearing along a sloping plane, a first drive wheel being situated on at least one of the chassis components, and one wheel on the other chassis component, a rotational speed differential between the rotational speed of the drive wheel and the rotational speed of the wheel being able to be brought about by a device.

This has the advantage that a height adjustment can be undertaken during a time period in which the two wheels have different rotational speeds. Equivalent thereto is a relative angle differential value between the angular value of the wheel and the drive wheel. According to the present invention, no supplementary element, such as an electric motor, is required for generating the lifting movement, but merely an influencing of the front wheels.

In one advantageous development, the chassis components are situated so as to be guided along the sloping plane, using a guidance device. This has the advantage that the chassis components can execute the movement only along the sloping plane.

In one advantageous development, a locking means is provided, which is able to block or enable the relative movement of the chassis components along the sloping plane. This has the advantage that irregularities during the maneuvering do not cause any height adjustment.

In one advantageous development, the device is a brake device, which acts on the wheel, in particular, the wheel being a fixed roller or a swivel roller, in particular. This has the advantage that only a single drive unit is required and the wheel situated on the other chassis component is able to be adjusted to a different rotational speed with the aid of a brake device.

In one advantageous development, the device has a controlled or regulated electric motor, which can be used to drive the wheel, especially at a predefined setpoint speed, which is the same as the rotational speed of the first drive during normal driving, i.e., especially driving without a lifting movement, and which differs when the lifting movement is executed. This has the advantage that a lifting movement is able to be performed in an uncomplicated manner. In particular, the lift is already possible during driving, the drives being operated differently. No separate lifting gear drive is necessary.

In one advantageous development, the drive wheel has a controlled or regulated electric motor, which can be used to drive the wheel, especially at a predefined setpoint speed, which is the same as the setpoint rotational speed of the wheel in standard driving without lifting movement and which differs when the lifting movement is executed. This has the advantage that the lifting movement is able to be brought about via wheels of the chassis components provided for maneuvering.

In one advantageous development, the direction of the normal of the sloped plane has a non-vanishing angular amount in relation to the direction of the normal of the maneuvering plane. This has the advantage that the sloping plane is not parallel with the maneuvering plane.

In one advantageous development, the drive wheel or the wheel is connected to the first or second chassis component via a linear guidance. This has the advantage that the drive wheel or wheel does not lose traction with the ground during the lifting movement.

In one advantageous development, swivel rollers or fixed rollers are situated on one or both chassis component(s). This has the advantage that the weight force can be introduced into the maneuvering surface via these rollers.

In one advantageous development, the control unit transmits control signals and/or control information, especially the setpoint rotational speed or the setpoint torque, to the converter and/or the device. This has the advantage of allowing a control of the lifting movement, in that the relative rotational speed difference is appropriately predefined for a time interval, i.e., a relative angular adjustment value of the wheels of the vehicle.

In one advantageous development, the drive wheel is pressed against the maneuvering plane with the aid of a spring element, which is braced on the chassis component, or a linear actuator. This is advantageous insofar as a clamping force of sufficient magnitude is able to be applied, so that the drive wheel will not lose contact with the ground.

The present invention is not restricted to the feature combination of the claims. Those skilled in the art will discover additional meaningful combination possibilities of claims and/or individual claim features and/or features of the specification and/or of the figures, that arise from the stated objective and/or the objective resulting from a comparison with the related art, in particular.

DETAILED DESCRIPTION

Figure 1:
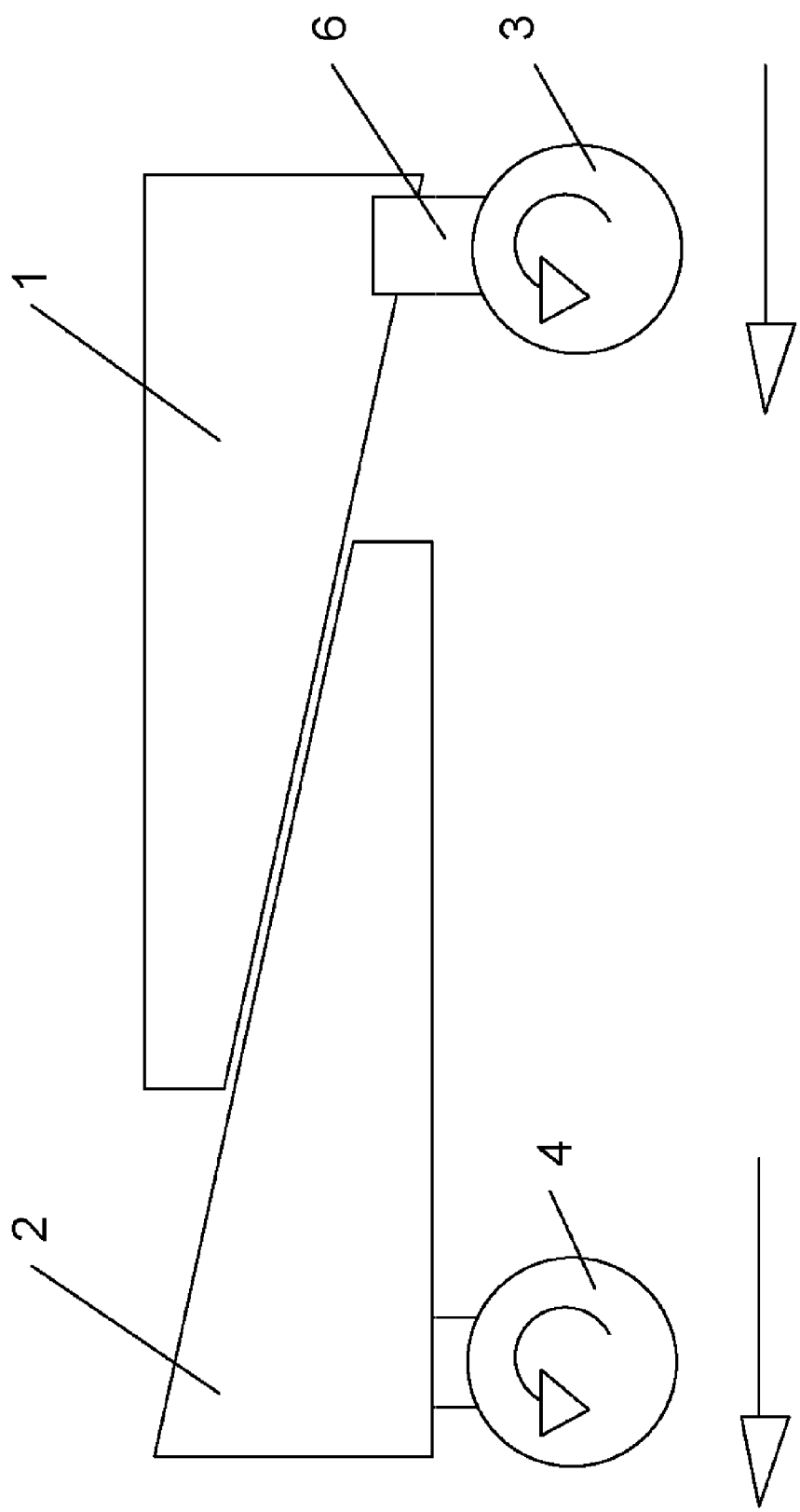
FIG. 1 shows a schematic illustration of a vehicle, especially a transport vehicle, for which standard driving is depicted.
Figure 2:
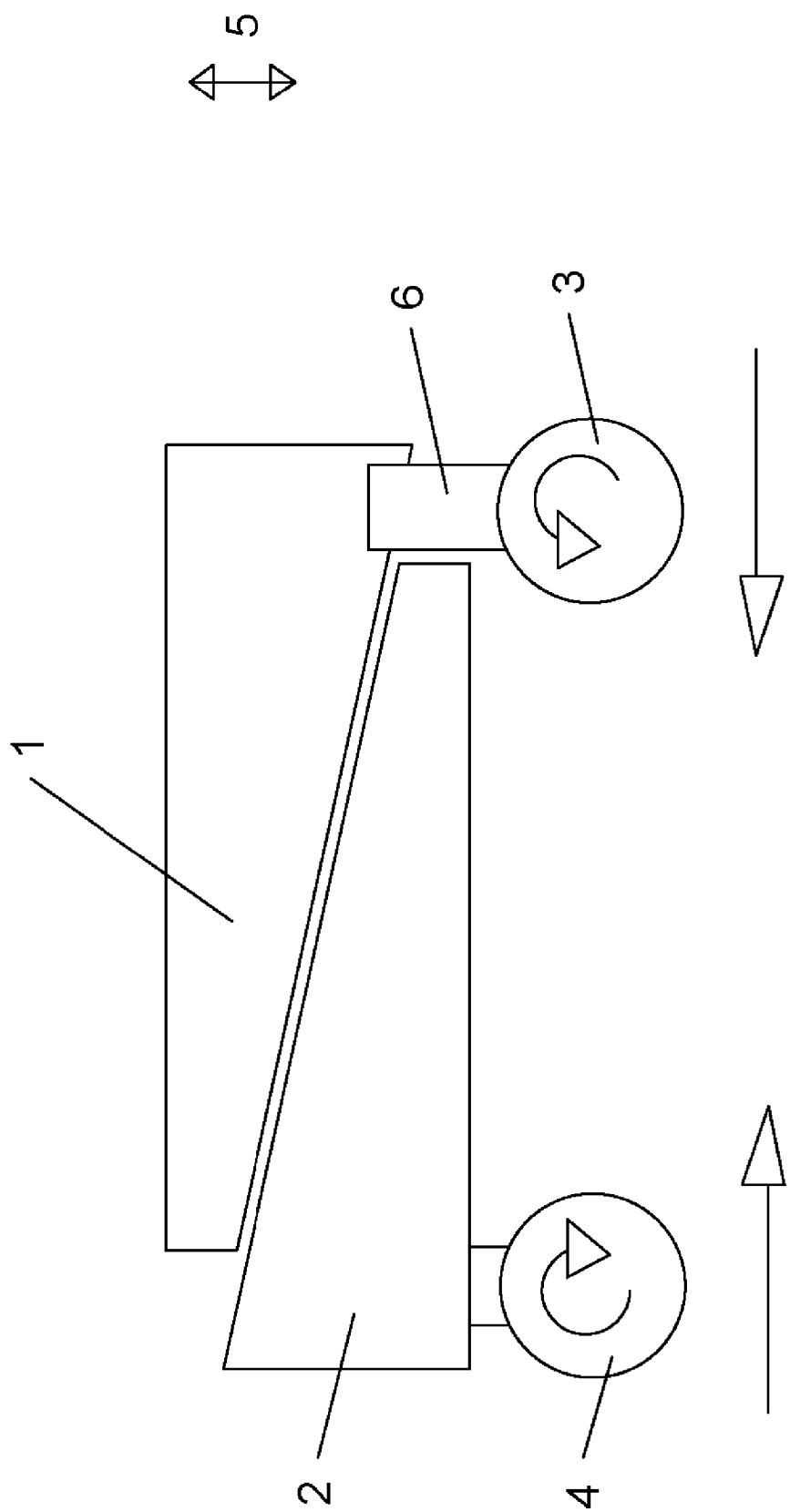
FIG. 2 illustrates the manner in which a lift 5 is realized in the vehicle.

As illustrated in FIGS. 1 and 2, the chassis of the vehicle features a sloping plane. That is to say, a first chassis component 1 and a second chassis component 2 are connected via a sloping plane, so that in a relative approach of the two chassis components (1, 2), one of chassis components 1, which is chassis component 1 in the example, is elevated. The top side of first chassis component 1 thus is able to be fitted with an object to be lifted.

In this way the vehicle according to the present invention is able to replace a forklift. A load picked up at a first height is therefore able to be transported to a different position at a different level.

First chassis component 1 is linked to a first drive wheel 3 via a linear guidance 6, which is able to be driven by an electric motor.

Linear guidance 6 makes it possible for the first drive wheel to stay in contact with the maneuvering surface during the lifting movement. In the course of the lifting movement, first chassis component 1 is raised and guided by linear guidance 6.

Second chassis component 2 likewise has a drive wheel 4, and this second drive wheel 4 is likewise able to be driven by an electric motor.

Instead of the individual wheels shown in the figures, multiple wheels can be used, which have drives that are operated in synchrony, especially electric motors.

As illustrated in FIG. 2, the lifting movement is produced by a relative movement toward each other, since the chassis components (1, 2) connected via the sloping plane, which may be developed to include a plain bearing or an antifriction bearing, for instance, are then moved toward each other and first chassis component 1 must therefore be raised, since the second chassis component has a second drive wheel 4 that is immovable in the lifting direction.

Second drive wheel 4 is supported on second chassis component 2 by means of a bearing. A bearing supports first drive wheel 3 on linear guidance 6, which in turn is connected to second chassis component 2.

The electric motors are supplied by a converter and preferably include sensors for recording the angular position of the rotor shaft of the individual electric motor or the particular drive wheel (3, 4). As a result, the angular positions of drive wheels (3, 4) are able to be regulated or controlled in a precise manner, especially when the electric motors are developed as synchronous motors. The height is thereby precisely controllable as well.

Instead of the bilateral movement of both drive wheels (3, 4) toward each other as shown in FIG. 2, it is also possible to move one of the wheels more slowly than the other. As a result, the load is already able to be lifted while the vehicle is driving. Braking of one of the drive wheels (3, 4) and a simultaneous movement of the other one of the drive wheels (3, 4) induces a lifting movement as well.

Figure 3:
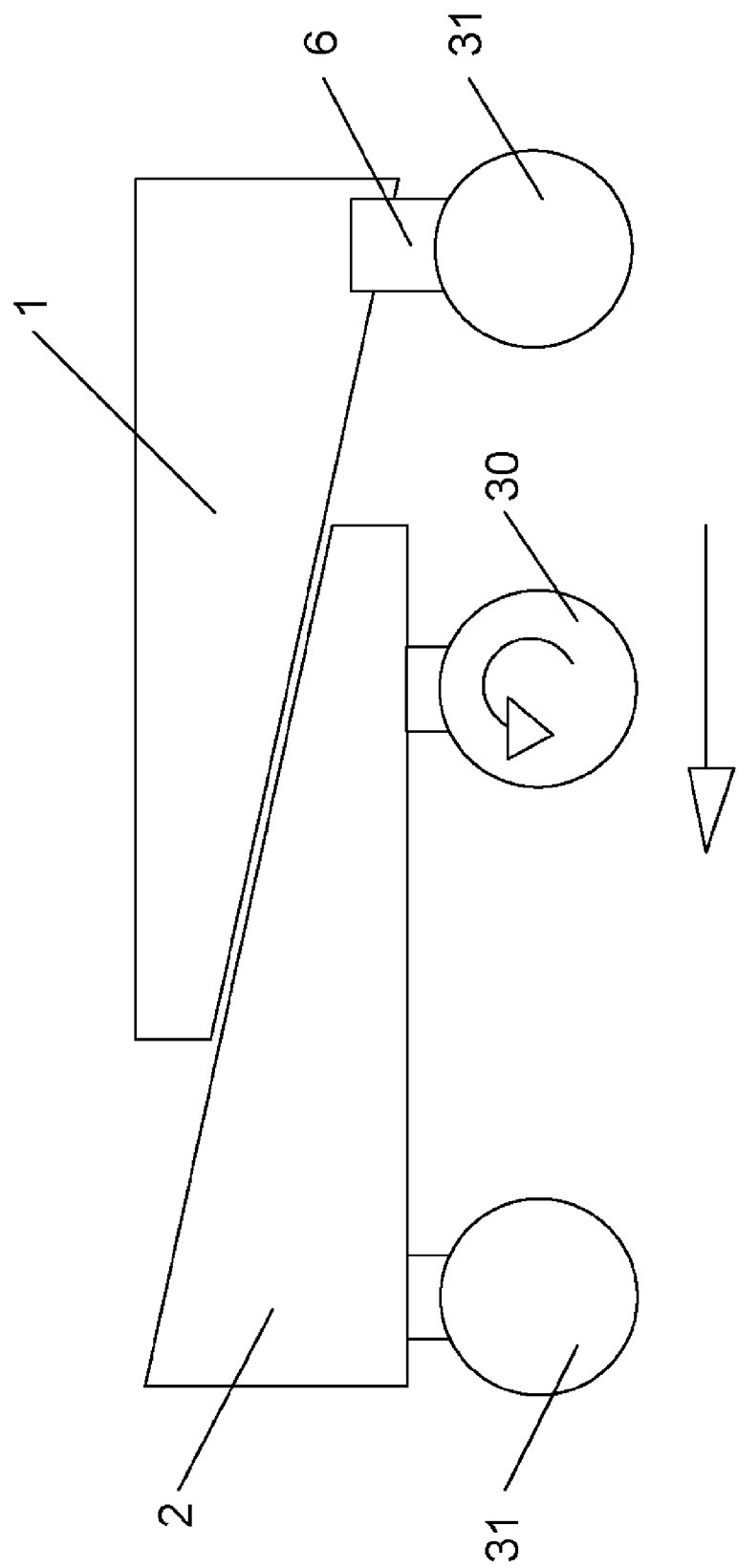
FIG. 3 shows normal driving for another vehicle according to the present invention, the vehicle having only one pair of drive wheels 30.
Figure 4:
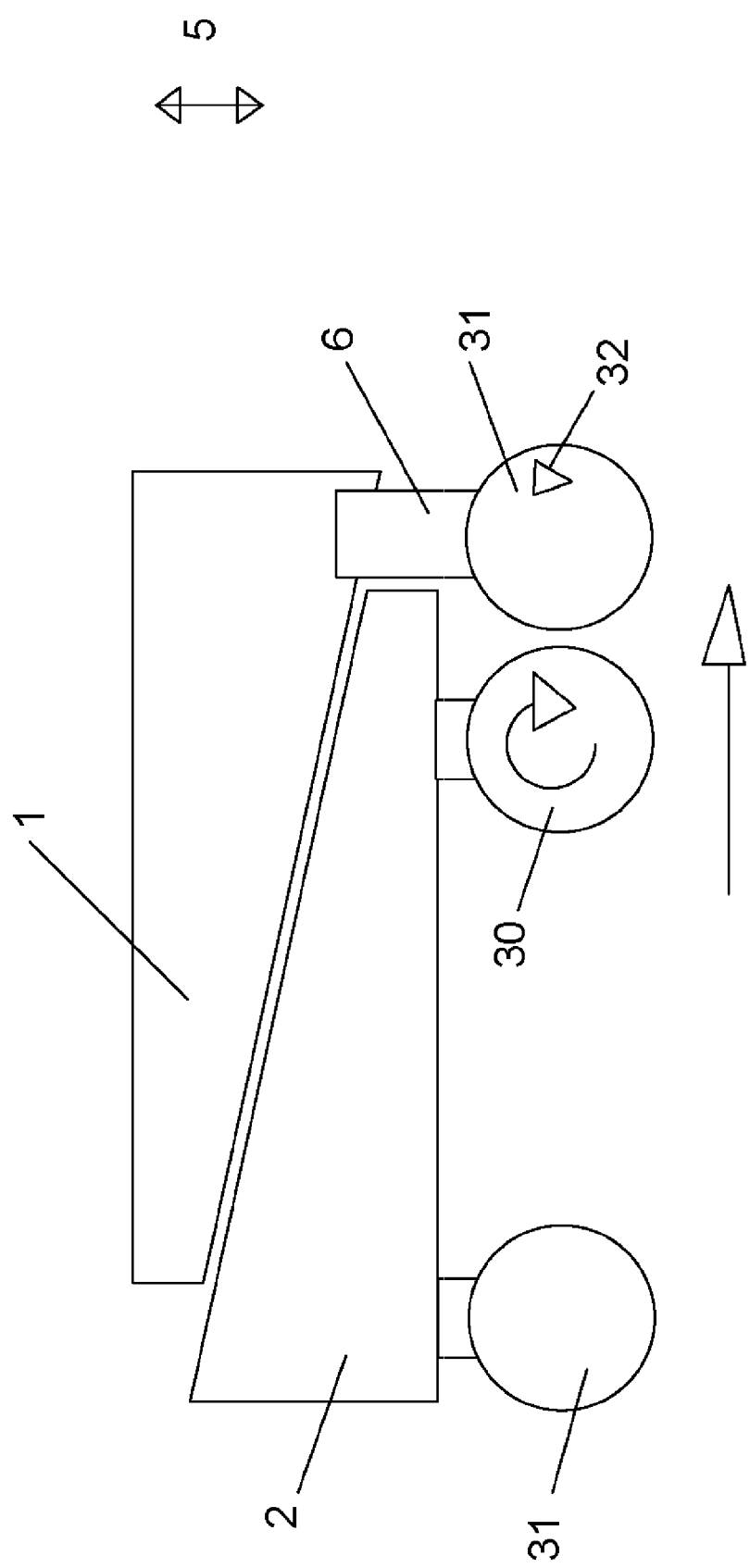
FIG. 4 depicts the manner in which a lift is realized in the vehicle according to FIG. 3.

As illustrated in FIG. 3 and FIG. 4, a lifting movement is able to be executed also when using only a single drive wheel 30 or only one type of drive wheels 30 operated in synchrony.

For if one or each of the two chassis component(s) (1, 2) is maneuverable on the maneuvering surface via fixed rollers 31, as illustrated in FIG. 3 and FIG. 4, a height adjustment by the relative movement of the two chassis components (3, 4) is also possible by decelerating one of the chassis components, in the example, first chassis component 1. A brake is disposed on this chassis component 1 for that purpose, or a brake 32 is situated on fixed roller 31 connected to first chassis component 1.

If the brake force is controllable, then the lift may already be executed in the course of driving, by appropriate braking of fixed roller 31.

Swivel rollers or also other wheels are usable as fixed rollers. The weight force is introduced into the maneuvering surface essentially via fixed rollers 31. Drive wheel 30 can be driven with the aid of the electric motor to which it is connected, which in turn is supplied from a converter. The drive wheel is preferably pressed against the maneuvering surface such that it does not lose traction. It is therefore not necessary to transmit the entire weight of the chassis component via drive roller 30.

Drive wheels 30 are preferably disposed so as to be steerable. That is to say, the wheel axle of drive wheels 30 is rotatable parallel to the maneuvering plane. To do so, the drive wheel is linked to second chassis component 2 via a pivot bearing.

The lift direction has been marked by reference numeral 5 in FIGS. 2 and 4 and takes place in the gravitational direction or counter thereto.

In one further exemplary embodiment according to the present invention, the sloping plane is lockable, so that no unintentional lifting of the load occurs when driving without a height adjustment.

In another exemplary embodiment according to the present invention, the two chassis components (3, 4) are guided along the sloping plane. As a result, only a relative displacement of the two chassis components (3, 4) toward each other along the sloping plane is possible.

In one further exemplary embodiment of the present invention, the vehicle is developed as a rail-guided vehicle. The principle of the present invention can easily be transferred to such vehicles as well. In such a case, rail wheels are used instead of the fixed rollers, and the drive wheels (2, 4, 30) are likewise realizable as rail wheels.

LIST OF REFERENCE NUMERALS

1 first chassis component
2 second chassis component
3 first drive wheel, in particular first drive roller
4 second drive wheel, in particular second drive roller
5 lift
6 linear guidance
30 drive wheel
31 fixed roller, especially a swivel roller
32 braked fixed roller 31

The invention claimed is:

1. A vehicle, comprising:
   a plurality of chassis components, at least two of the chassis components connected by a sloping plane;
   a first drive wheel situated on at least one of the chassis components;
   another wheel situated on another one of the chassis components; and
   a device configured to drive the other wheel at a rotational speed different from a rotational speed of the first drive wheel.

2. A vehicle, comprising:
   a plurality of chassis components, at least two of the chassis components connected by a sloping plane;
   a first drive wheel situated on at least one of the chassis components;
   another wheel situated on another one of the chassis components; and
   a device by which a rotational speed differential between a rotational speed of the drive wheel and a rotational speed of the other wheel is brought about;
   wherein the at least two of the chassis components are connected by at least one of a guidance device and a sliding bearing along the sloping plane.

3. The vehicle as recited in claim 1, wherein the chassis components are situated so as to be guided along the sloping plane by a guidance device.

4. The vehicle as recited in claim 1, further comprising:
   a locking arrangement for one of locking and enabling a relative movement of the chassis components along the sloping plane.

5. A vehicle, comprising:
a plurality of chassis components, at least two of the chassis components connected by a sloping plane;
a first drive wheel situated on at least one of the chassis components;
another wheel situated on another one of the chassis components; and
a device by which a rotational speed differential between a rotational speed of the drive wheel and a rotational speed of the other wheel is brought about;
wherein the device is a brake device that acts on the other wheel.

6. The vehicle as recited in claim 5, wherein the other wheel includes one of a fixed roller and a swivel roller.

7. A vehicle, comprising:
a plurality of chassis components, at least two of the chassis components connected by a sloping plane;
a first drive wheel situated on at least one of the chassis components;
another wheel situated on another one of the chassis components; and
a device by which a rotational speed differential between a rotational speed of the drive wheel and a rotational speed of the other wheel is brought about;
wherein:
the device includes one of a controlled electric motor and a regulated electric motor that drives the other wheel at a predefined setpoint speed that is the same as the rotational speed of the first drive wheel in normal driving, the normal driving occurring without a lifting movement, and that differs when executing the lifting movement.

8. A vehicle, comprising:
a plurality of chassis components, at least two of the chassis components connected by a sloping plane;
a first drive wheel situated on at least one of the chassis components;
another wheel situated on another one of the chassis components; and
a device by which a rotational speed differential between a rotational speed of the drive wheel and a rotational speed of the other wheel is brought about;
wherein:
the device includes one of a controlled electric motor and a regulated electric motor that drives the other wheel at a predefined setpoint speed that is the same as a setpoint rotational speed of the other wheel in normal driving, the normal driving occurring without a lifting movement, and that differs therefrom when executing the lifting movement.

9. The vehicle as recited in claim 1, wherein a direction of a normal of the sloping plane has a non-vanishing angular amount in relation to a direction of a normal of a maneuvering plane.

10. The vehicle as recited in claim 1, wherein one of the drive wheel and the other wheel is connected to one of a first one of the chassis components and a second one of the chassis components via a linear guidance.

11. A vehicle, comprising:
a plurality of chassis components, at least two of the chassis components connected by a sloping plane;
a first drive wheel situated on at least one of the chassis components;
another wheel situated on another one of the chassis components; and
a device by which a rotational speed differential between a rotational speed of the drive wheel and a rotational speed of the other wheel is brought about; and
one of swivel rollers and fixed rollers situated on at least one of the chassis components.

12. A vehicle, comprising:
a plurality of chassis components, at least two of the chassis components connected by a sloping plane;
a first drive wheel situated on at least one of the chassis components;
another wheel situated on another one of the chassis components; and
a device by which a rotational speed differential between a rotational speed of the drive wheel and a rotational speed of the other wheel is brought about; and
a control unit for transmitting at least one of a control signal and control information to the converter and/or the device.

13. The vehicle as recited in claim 12, wherein the one of the control signal and the control information includes one of a setpoint rotational speed and a setpoint torque.

14. A vehicle, comprising:
a plurality of chassis components, at least two of the chassis components connected by a sloping plane;
a first drive wheel situated on at least one of the chassis components;
another wheel situated on another one of the chassis components; and
a device by which a rotational speed differential between a rotational speed of the drive wheel and a rotational speed of the other wheel is brought about; and
wherein the drive wheel is pressed against a maneuvering plane with the aid of one of a linear actuator and a spring element braced on one of the chassis components.

* * * * *